United States Patent [19]

Hamaguchi et al.

[11] Patent Number: 5,737,568
[45] Date of Patent: Apr. 7, 1998

[54] METHOD AND APPARATUS TO CONTROL CACHE MEMORY IN MULTIPROCESSOR SYSTEM UTILIZING A SHARED MEMORY

[75] Inventors: Kazumasa Hamaguchi, Kawasaki; Shigeki Shibayama, Yokohama, both of Japan

[73] Assignee: Canon Kabushiki Kaisha, Tokyo, Japan

[21] Appl. No.: 393,927

[22] Filed: Feb. 21, 1995

Related U.S. Application Data

[63] Continuation of Ser. No. 723,386, Jun. 28, 1991, abandoned.

[30] Foreign Application Priority Data

Jul. 9, 1990 [JP] Japan ................................ 2-179541

[51] Int. Cl.⁶ ............................................... G06F 13/14
[52] U.S. Cl. ........................ 395/448; 395/468; 395/473
[58] Field of Search ............................ 395/446, 448, 395/468, 471, 473, 474, 483

[56] References Cited

U.S. PATENT DOCUMENTS

| | | | |
|---|---|---|---|
| 4,141,067 | 2/1979 | McLagan | 395/425 |
| 4,463,420 | 7/1984 | Fletcher | 395/425 |
| 4,471,429 | 9/1984 | Porter et al. | 395/400 |
| 4,622,631 | 11/1986 | Frank et al. | 395/800 |
| 4,638,431 | 1/1987 | Nishimura | 395/425 |
| 4,747,043 | 5/1988 | Rodman | 395/425 |
| 4,755,930 | 7/1988 | Wilson, Jr. et al. | 395/425 |
| 4,924,379 | 5/1990 | Kinnan | 395/425 |
| 4,933,835 | 6/1990 | Sachs et al. | 395/425 |
| 5,025,365 | 6/1991 | Mathur et al. | 395/600 |
| 5,193,189 | 3/1993 | Flood et al. | 395/650 |
| 5,210,848 | 5/1993 | Liu | 395/425 |
| 5,222,224 | 6/1993 | Flynn et al. | 395/425 |
| 5,226,144 | 7/1993 | Moriwaki et al. | 395/425 |
| 5,230,070 | 7/1993 | Liu | 395/425 |
| 5,251,308 | 10/1993 | Frank et al. | 395/425 |
| 5,276,828 | 1/1994 | Dion | 395/425 |
| 5,283,886 | 2/1994 | Nishii et al. | 395/425 |
| 5,289,588 | 2/1994 | Song et al. | 395/425 |
| 5,297,269 | 3/1994 | Donaldson et al. | 395/325 |

OTHER PUBLICATIONS

ACM Transactions On Computer Systems,"Cache Coherence Protocols: Evaluation Using a Multiprocessor Simulation Model", vol. 4, No. 4, Nov. 1986, J. Archibald et al., pp. 273–298.

*Primary Examiner*—David L. Robertson
*Attorney, Agent, or Firm*—Fitzpatrick, Cella, Harper & Scinto

[57] ABSTRACT

In a multiprocessor system having a shared memory containing the state of the data for every entry in each cache memory possessed by each processor. The state of the data is set to a "shared state" when the data is shared with other cache memories, and is set to a "shared stale state" when the data in the "shared state" becomes stale by updating performed in another cache memory. Each processor monitors a transaction generated on a bus, derives a data portion from the bus when it is in the same address as the data in the "shared stale state" of its own cache memory, thereby updating the data in the address and making the state of the data a "shared state".

7 Claims, 6 Drawing Sheets

METHOD AND APPARATUS TO CONTROL CACHE MEMORY IN MULTIPROCESSOR SYSTEM UTILIZING A SHARED MEMORY

This application is a continuation of application Ser. No. 07/723,386, filed Jun. 28, 1991, now abandoned.

BACKGROUND OF THE INVENTION

1. Field of the Invention

This invention relates to a method of controlling a cache memory for each processor in a system in which a plurality of processors share a memory.

2. Description of the Prior Art

In order to improve performance in a computer system, multiprocessor systems comprising a plurality of processors and thereby performing parallel processing have been used. Among various kinds of multiprocessor systems, a shared-memory-type multiprocessor system (hereinafter simply termed a multiprocessor), wherein a plurality of processors share a memory in order to share data and perform job scheduling, has been widely accepted since this system has high affinity with a programming model in conventional multiprogramming.

In a multiprocessor of this type, access to a shared memory is apt to be a bottleneck. In order to solve this bottleneck, a method is usually adopted wherein a copy of the shared memory is stored in a cache memory of each processor, and access to the shared memory is replaced by access to the cache memory, thus reducing actual accesses to the shared memory. In this approach, since a plurality of processors store copies of the same data block in respective cache memories, all the processors must have a consistent memory image based on the shared memory. This may cause a consistency problem between cache memories in a multiprocessor, and various kinds of solutions to this problem have been proposed. For example, a write-once method, a Berkeley method, an Illinois method, a Dragon method, a Firefly method and the like have been described in "Cache Consistency Protocols: Evaluation Using a Multiprocessor Simulation", ACM Transactions on Computer Systems, Vol. 4, No. 4, Nov. 1986, pp, 273-298 by Archibald, J. and Baer, J. L.

These methods are roughly divided into an invalidating method (hereinafter termed an INV method) and a broadcast method (hereinafter termed a BC method).

In the INV method, if copies of the same data block are present in respective cache memories of a plurality of processors, a processor, which executes writing in the block, transmits a signal command to invalidate the data block and the address thereof onto a bus. A bus monitoring device at each of the other processors refers to a tag memory with its own cache memory, on the basis of the address transmitted onto the bus. If the same data block is present in its own cache memory, the device invalidates the block so that wrong data is not used.

Figure 6:
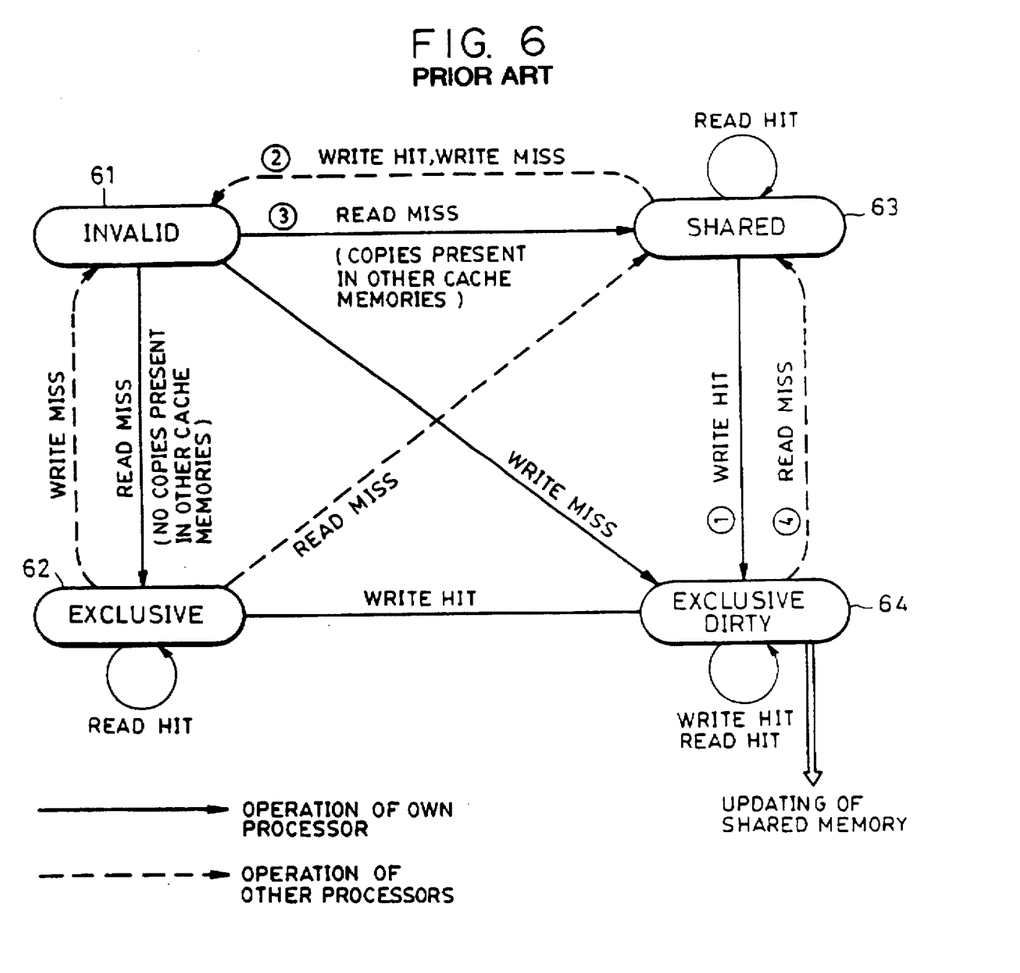
FIG. 6 is a transition diagram of a conventional method.

FIG. 6 shows an example of a transition diagram in a cache memory control method using a conventional INV method.

This transition diagram is based on cache consistency protocols (described in the above-described literature) proposed by the University of Illinois. In transition conditions, read miss and write miss indicate a case wherein desired data are not present within the cache memory, and read hit and write hit indicate a case wherein desired data are present within the cache memory. Among the transition conditions, those represented by solid-line arrows are transitions by the operations of a local processor, and those represented by broken-line arrows are transitions by the operations of remote processors.

Reference numeral 61 represents an invalid state (hereinafter termed an INV state) indicating that the entry is invalid. At the initial state of the system, all entries are in the INV state.

Reference numeral 62 represents an exclusive state (hereinafter termed an EX state) indicating that the cache memory having the entry exclusively owns the entry. In the EX state, the block of the entry is not present in the other cache memories.

Reference numeral 63 represents a shared state (hereinafter termed an SH state) indicating that the cache memory having the entry shares the block of the entry with other cache memories. At that time, a plurality of cache memories hold the same data of the block of the entry.

Reference numeral 64 represents an exclusive dirty state (hereinafter termed an EXD state) indicating that the cache memory having the entry exclusively owns the entry and performs a writing operation, causing inconsistency with a main memory.

Each state is held for every entry in a cache memory, and is usually stored in a memory for control, termed a tag memory, and encoded.

In the BC method, a processor executing a writing operation transmits the address and data of a data block to be written on a bus so as to be received in the other processors. The same data block within each processor is thereby always updated, thus maintaining consistency of data.

In the above-described INV method, however, in any processor having an invalidated block, cache miss is inevitably produced when trying to access the block if once invalidated, and it is necessary to read the data of the block from a shared memory or another cache memory having a valid copy, thereby decreasing the processing performance of the system. On the other hand, in the BC method, an updated data block is broadcasted every time, over the entire system, irrespective of the necessity of the data block in the respective processor. Hence, this method has the disadvantage of increasing the overhead of the system.

That is, the two methods have their advantages and disadvantages such that the BC method is superior in the case of a software architecture in which updated data are frequently used in a large number of processors, and the INV method is superior in the case of a software architecture in which the same data are not used in a large number of processors.

SUMMARY OF THE INVENTION

It is an object of the present invention to provide a cache memory control method which is suitable for all kinds of software architectures.

It is another object of the present invention to provide a cache memory control method which produces little cache miss and does not require an extra processing time for unnecessary data updating.

It is still another object of the present invention to provide a cache memory control method wherein, when updating a data block in accordance with a cache miss produced in a cache memory, the same block in other cache memories can be updated.

According to one aspect, the present invention achieves these objectives using a method of controlling a cache memory for a processor in a multiprocessor system, which is equipped with a shared memory, the method comprising the steps of storing a state of data for every entry in each cache memory, monitoring by each processor the transactions generated on a system bus by another apparatus, checking whether or not an entry having a stale state in the same address as an address of the generated transaction is present in its own cache memory, deriving a data portion in the transaction as data of the entry if the entry is present, and validating the state of the data of the entry.

According to another aspect, the present invention achieves these objectives using a processor constituting a multiprocessor system by being connected to other processors via a system bus, the processor comprising cache memory means for storing the state of data for every entry together with the data, monitoring means for monitoring a transaction generated on the system bus by another apparatus, determining means for determining whether or not an entry having a state that is invalid in the same address as an address of the generated transaction is present in the cache memory means, and means for deriving a data portion in the transaction from the bus as data of the entry if the determining means has determined that the entry is present.

Other objectives and advantages besides those discussed above shall be apparent to those skilled in the art from the description of preferred embodiments of the invention which follows. In the description, reference is made to accompanying drawings, which form a part thereof, and which illustrate examples of the invention. Such examples, however, are not exhaustive of the various embodiments of the invention, and therefore reference is made to the claims which follow the description for determining the scope of the invention.

DETAILED DESCRIPTION OF THE PREFERRED EMBODIMENTS

The preferred embodiments of the present invention will now be explained with reference to the drawings.

Figure 1:
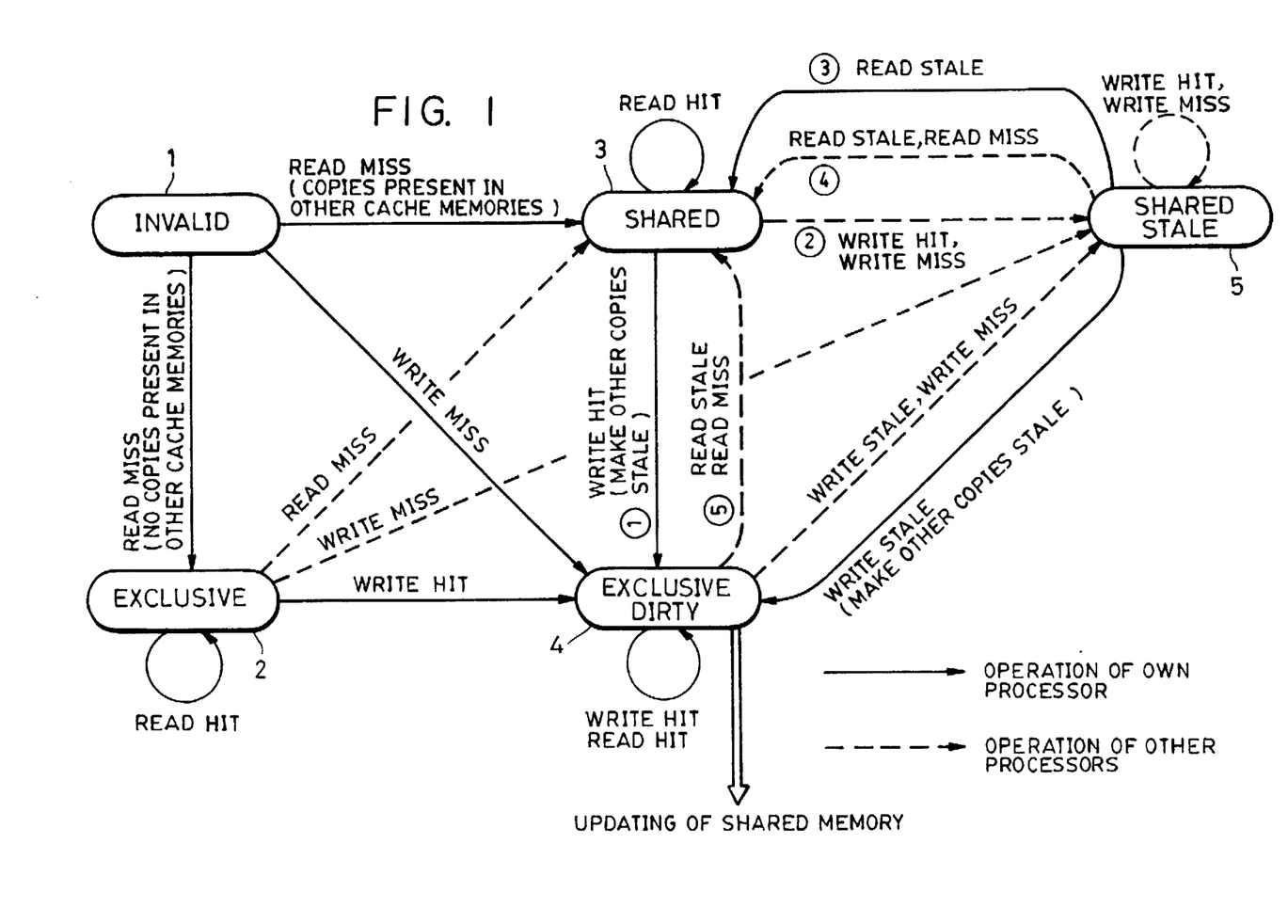
FIG. 1 is a transition diagram of a first embodiment of the present invention.

FIG. 1 shows a transition diagram of a cache memory control method according to a first embodiment of the present invention.

The present transition diagram is obtaind by adding a "shared stale state", which is a newly introduced state in the present invention, to the transition diagram shown in FIG. 6.

Among transition conditions, read stale and write stale are read/write operations in the shared stale state.

In the present embodiment, in order to make clear the advantages of the shared stale state, read miss and read stale, and write miss and write stale, are separately shown, respectively. However, each of these pairs represent essentially the same condition, and therefore need not be separated.

The shared stale state (hereinafter termed the SHS state) introduced in the present invention indicates that a cache memory having the entry has previously shared the block with cache memories of other processors, but the block becomes stale due to a writing operation in the block in another cache memory. At that time, the entry is in an EXD state in the cache memory of the processor having performed the writing operation.

Figure 2:
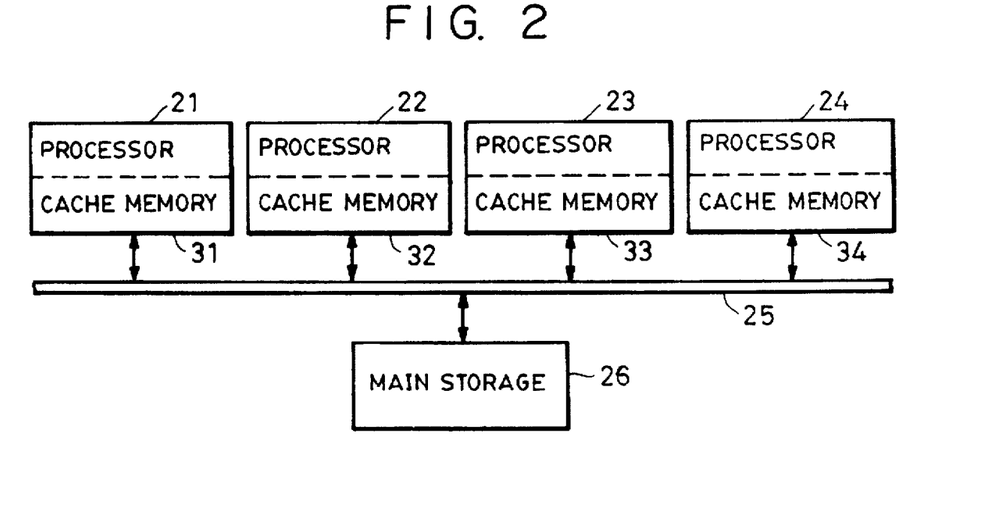
FIG. 2 shows an example of the configuration of a multiprocessor to which the present invention is applied.

FIG. 2 is a block diagram of a multiprocessor to which the present invention is applied. Processors 21, 22, 23 and 24 have cache memories 31–34, respectively, using the cache memory control method of the invention and are connected to a main storage 26 via a system bus 25. An explanation will now be provided of specific operations of the present cache memory control method with reference to this configuration. In the present embodiment, an explanation will be provided mainly of the transition between the SH state and the SHS state generated in response to the operation of another processor. The transition from the SHS state to the SH state due to read stale, and to the EXD state due to write stale are added corresponding to the transition from the conventional INV state to the SH state and to the EXD state. The transition most characterizing the addition of the SHS state of the present invention is the transition between the SH state and the SHS state indicated by broken lines in FIG. 1.

Figure 3:
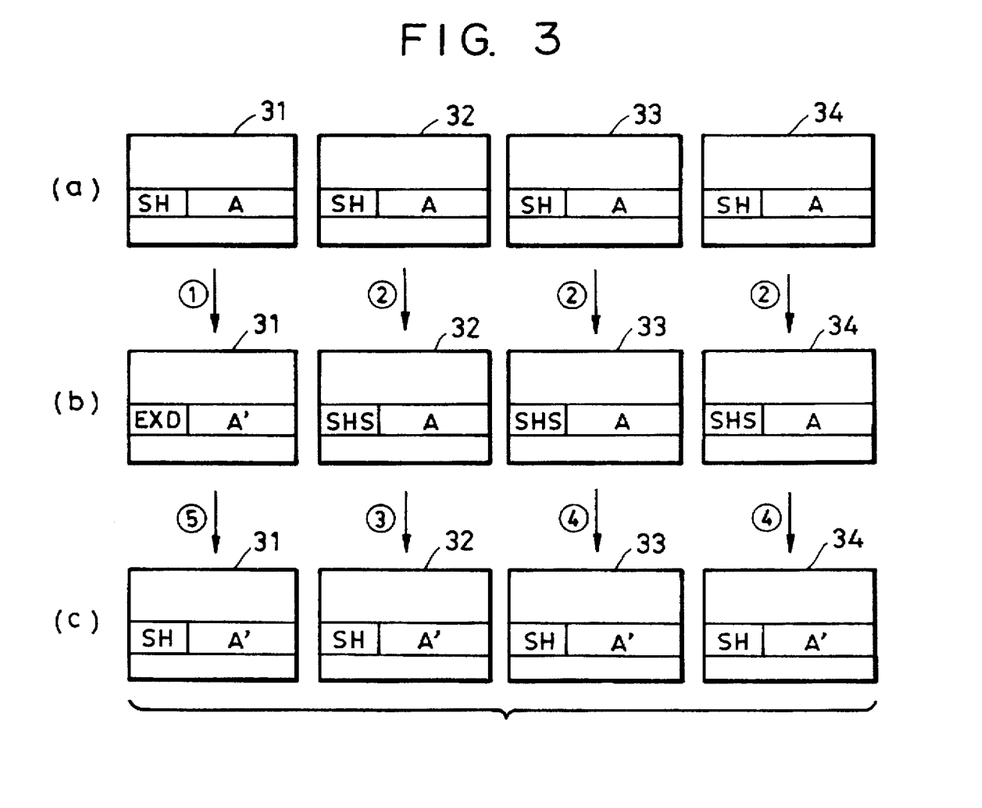
FIGS. 3(a)-3(c) illustrate the contents of cache memories in order to explain the present invention.

FIG. 3 illustrates the states of cache memories of the multiprocessor shown in FIG. 2 at a certain time period.

FIG. 3(a) shows a state wherein data "A" of the same address of the main storage 26 is shared in the cache memories 31, 32, 33 and 34. An explanation will be provided assuming that the address where the data is stored, for example, is address 1000. A tag memory in each cache memory stores address information (not shown). In this case, the address information indicates address 1000. Since the data "A" of address 1000 is shared, the data in each cache memory is in the SH state.

When the processor 21 updates the data "A" of the entry from the state shown in FIG. 3(a) to data "A'", the processor 21 writes the data "A'" in its own cache memory and makes the cache memory enter an EXD state (corresponding to the transition condition ① shown in FIG. 1), as shown in FIG. 3(b). At the same time, the cache memory control device of the processor 21 determines that other cache memories sharing the entry are present since the data "A" is in the SH state, and transmits a signal for instructing the other cache memories to make the entry enter the SHS state and the address (address 1000) via the bus 25.

The cache memory control device of each processor performs bus monitoring. When the device has received the signal for instructing the cache memory to make the entry enter the SHS state, if the entry of the address is determined to be present within its own tag memory using the address on the bus at that time period, the device rewrites the state of the entry to an SHS state (corresponding to the transition condition ② shown in FIG. 1). The SHS state indicates that the data has previously been shared with other cache memories, but now has become stale data since the data has been rewritten in another cache memory. In the prior art, since the SHS state is not present, the entry is in the INV state. Although the SHS state resembles the INV states the SHS state has information that the entry of the address has been used by the processor at least in the past.

If the processor 22 subsequently tries to perform a reading operation in order to again process the data of address 1000 from the state shown in FIG. 3(b), the tag memory stores the entry of address 1000, and the processor 22 recognizes that the data are stale since the entry is in the SHS state. Hence, the processor 22 generates a transaction on the bus 25 as a cache miss (this operation is represented as read stale in the present embodiment). At that time, since the cache memory control device of the processor 21 monitors the transaction, the processor 21 writes the valid data "A'" of address 1000 present in the cache memory 31 in the main storage 26 and makes the cache memory 31 enter an SH state (corresponding to the transition condition ⑤ shown in FIG. 1). Since the address and the data are present on the bus 25 when being written in the main storage 26, the processor 22 causing the bus transaction receives the data from the bus 25, rewrites the data in its own cache memory to the data "A'", and makes the cache memory enter an SH state (corresponding to the transition condition ③ shown in FIG. 1).

At that time, since the cache memory control devices of the processors 23 and 24 also monitor the transaction, the devices can detect the address and the data present on the bus 25. The cache memory control devices of the processors 23 and 24 compare the address present on the bus 25 with the contents of respective tag memories. In the case of the present embodiment, since each of said devices detects that the latest data of the entry of which the same address stored in each cache memory in the SHS state is present on the bus 25, each of the data of the entries in cache memories 33 and 34 are updated with the latest data "A'" on the bus 25 and are provided an SH state (the transition condition ④ shown in FIG. 1). Since this operation is performed in parallel with the bus transaction which the processor 21 has generated in accordance with the cache miss by the processor 22, extra time is not consumed. As a result, the states of the cache memories change as shown in FIG. 3(c). If either processor 23 or 24 subsequently tries to perform reading operations in order to process the data of address 1000, a read hit is provided. Hence, it is possible to omit extra bus transactions.

Figure 7:
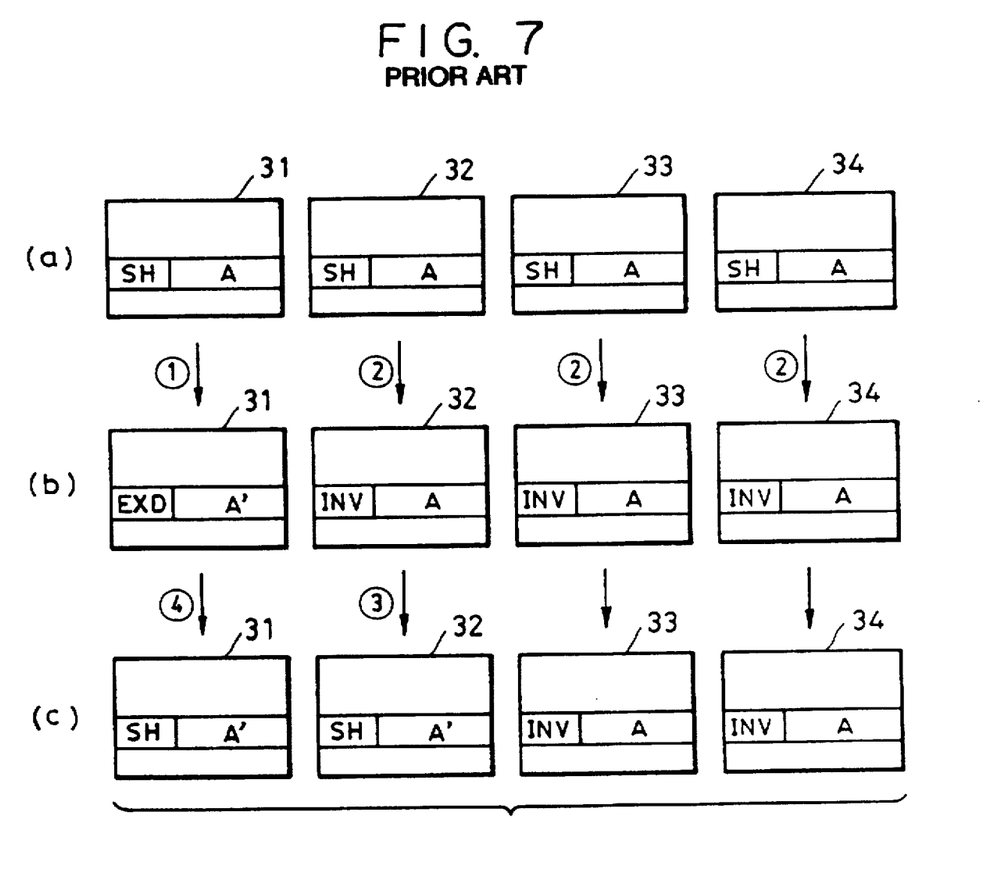
FIGS. 7(a)-7(c) illustrate the contents of conventional cache memories which correspond to those shown in FIG. 3.

On the other hand, in the conventional INV method, the SHS state is not present, as shown in FIG. 6. Hence, if a rewriting operation is performed in the cache memory 31 in the state shown in FIG. 7(a) which is the same as the state shown in FIG. 3(a), entries of address 1000 in the cache memories 32, 33 and 34 are made to be in the INV state (the transition condition ② shown in FIG. 6), as shown in FIG. 7(b). Accordingly, even if a transaction due to a cache miss of the processor 22 is generated, the contents of address 1000 in the cache memories 33 and 34 remain in the INV state, and the data is not received in the cache memory due to the bus transaction. As a result, in the conventional method, as shown in FIG. 7(c), the copy of the data "A'" is transmitted only to cache memory 32. In the state shown in FIG. 7(c), if, for example, processor 23 accesses address 1000 in the cache memory 33, this access becomes a cache miss. Hence, in order to solve this cache miss, one of the processors 21 and 22 having a higher priority must transfer data of its own cache memory using the bus 25. Since this operation requires an extra bus cycle, the processing speed of the system is reduced.

According to the present embodiment, even if a previously used entry of a cache memory becomes stale due to a writing operation of another processor, when transferring data due to a cache miss produced when a processor having the stale data actually requires the data, the data is received also in other cache memories. Hence, the present embodiment improves the hit rate. If the entry is used by no processors in the future, the data is never accessed. Hence, the data is merely erased from cache memories in due time by a cache replacement algorithm without generating a transaction on the bus. Hence, the performance of the system is not reduced. When cache consistency protocols of the BC method are adopted, not only addresses but also modified data are transmitted on the bus in every writing operation. Hence, there is the possibility of frequent occurrence of wasteful bus transactions. According to the cache memory control method of the present invention, however, since the above-described broadcast is performed when the data is actually required by another processor, the wasteful bus transactions can be prevented.

An explanation will now be provided of a second embodiment of the present invention. The first embodiment illustrates a copy-back method wherein, when a writing operation hits a cache memory, updating of data is performed only on the cache memory, and a writing operation of data in a main storage is performed when the entry is expelled from the cache memory or when a cache miss is produced by another processor. The second embodiment illustrates a write-through method wherein a writing operation by any processor is simultaneously reflected also in a main storage.

Figure 4:
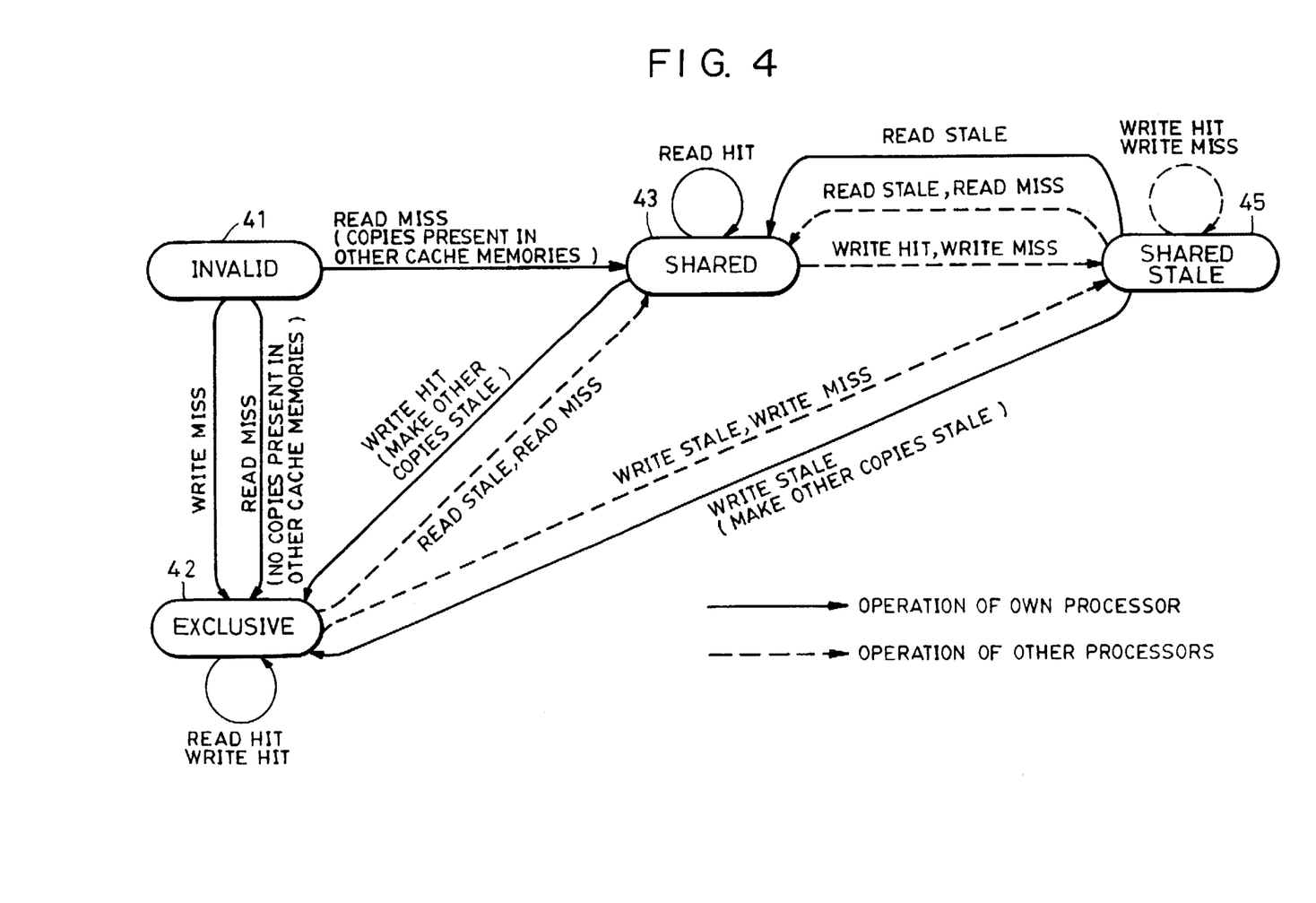
FIG. 4 is a transition diagram of a second embodiment of the present invention.

FIG. 4 shows a transition diagram of the cache memory control method according to the second embodiment. As in the first embodiment, an invalid (INV) state 41 is an initial state wherein any entry in each cache memory is invalid. An exclusive (EX) state 42 is a state wherein only a copy of the main storage is present in a cache memory. A shared (SH) state 43 is a state wherein copies of the same address are present in a plurality of cache memories. A shared stale (SHS) state 45 is a state wherein a shared entry becomes stale due to a writing operation from another processor. In the second embodiment, the exclusive dirty (EXD) state ④ shown in FIG. 1, where a cache memory becomes incoincident with the main storage, is not present.

In the present embodiment, the transition to the SHS state is generated in the following cases: (1) When the contents of data of the entry become stale in the cache memory having only the copy of the main storage due to write miss (write stale) for the block having the same entry of another processor; and (2) In the case that a plurality of processors share a copy of the main storage in respective cache memories, when write hit by one of the processors or write miss by another processor which does not have the data of the entry in its own cache memory occurs, and the contents of the data of the entry become stale in the cache memories of other processors, When the processor having the cache memory which has entered an SHS state needs to access the data of the entry and generates a transaction on the bus as a read stale, or when a processor which does not have the data of the entry produces a transaction as a read miss, other cache memories wherein the same entry of the block that is to be accessed is in the SHS state monitor the data reading operation of the cache memory which has produced read miss or read stale, and updates its own block data to the latest data. Also in this case, since updating operations simultaneously occur in the same blocks of all the cache memories during an updating operation necessary in a cache memory, it becomes unnecessary to subsequently repeat reading operations of the same blocks, thus greatly contributing to higher speed of the system as in the first embodiment.

Figure 5:
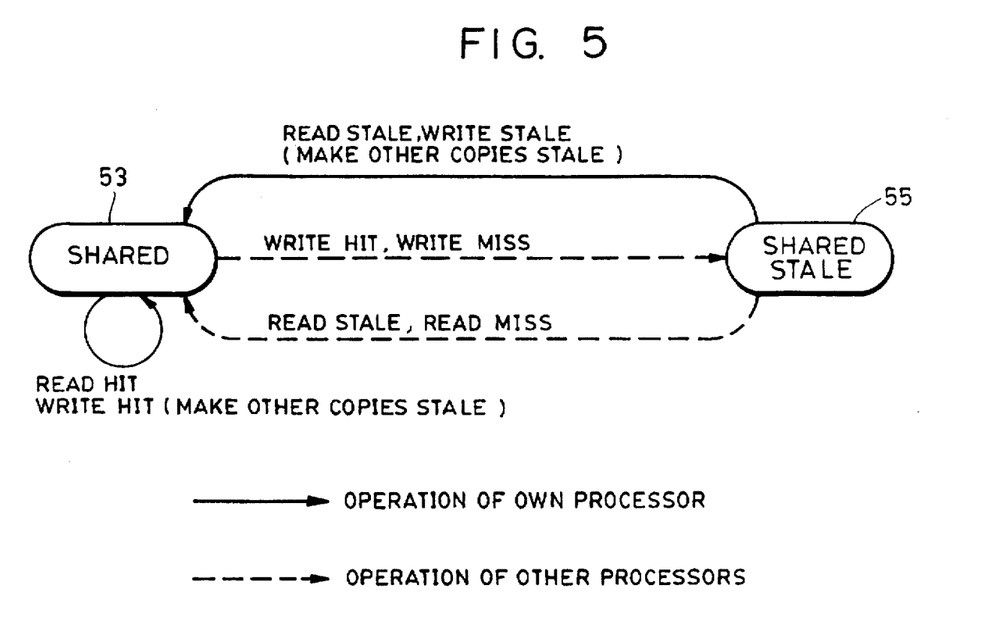
FIG. 5 is a transition diagram of a third embodiment of the present invention.

Next, a third embodiment will be explained. In a transition diagram of the third embodiment, the invalid (INV) state is removed from the transition diagram of the second embodiments as shown in FIG. 5. In the second embodiment, since the INV state is necessary only in an initial state, it is possible to rewrite this state to the SHS state. So far, the SHS state indicates a history that the data of the block is currently invalid, but the data of the block has once been stored in the cache memory. In an initial state wherein power is supplied to the system, strictly speaking, no entries in all cache memories have been used. However, if the history of a cache memory, when it has previously been used has been recorded in a nonvolatile storage means, such as a magnetic disk or the like, and the most "plausible" history among the past history has been written in a tag memory during the initialization of the system, it is possible to read data having a high possibility of being used in the cache memory from the first beginning by a bus transaction of another processor without delaying the operations of other processors.

In FIG. 5, the EX state disappears. The EX state indicates a state wherein a copy of the main storage is present in only one cache memory. So, the meaning of the SH state may be expanded so that copies of the main storage are present in at least one cache memory. In the transition between the SH state and the SHS state, the system loads on the tag memory of a cache memory with an appropriate history during the initialization of the system, and shifts the cache memory to the SH state when the processor actually produces a read miss (read stale) and receives the block from the bus. When the same block as in the SHS state is to be received from the bus by another processor, a high hit rate can be obtained by also receiving the data from the bus and loading the data in the cache memory.

In the present invention, various changes and modifications may be made in addition to the above-described embodiments. For example, in case a tag memory having an entry in a cache memory is shared by the access of the cache memory from the processor and the access for monitoring from the bus, when a tag memory having an entry in an SHS state is exclusively possessed by the access from the processor though the latest data is on the bus, the consistency of the cache memory can be maintained by leaving the entry of the cache memory in the SHS state without receiving the data on the bus. It is thereby possible to perform processing without waiting for a program generating a transaction on the bus. It is also possible to execute the cache memory control method of the present invention only within a certain range of the memory space, and apply a conventional cache memory control method to the other portions. In short, various changes and modifications may be made to the invention without departing from the spirit and scope thereof.

According to the present invention, it is possible to provide a cache memory control method which performs optimum control of a cache memory in consideration of access to a shared memory and overhead between processors in all kinds of software architectures.

That is, in the present invention, by providing a shared stale state wherein previously used data becomes stale due to a writing operation of another processor as one of states of an entry in a cache memory, and loading data to the entry in the shared stale state when the data in the same address as the entry is read by another processor, a cache memory control method which has the advantage in efficiency during a writing operation in a cache memory possessed by cache consistency protocols of the invalidating method, and the advantage of high hit rates possessed by the broadcast method.

What is claimed is:

1. A method of controlling a cache memory for a local processor in a multiprocessor system, which is equipped with a shared memory and a plurality of local processors each having a respective cache memory, said method comprising the steps of:

storing a state of data validity for every entry in each cache memory;

monitoring, by each local processor, transactions on a system bus generated owing to read miss by other processors;

generating a transaction requiring data of a shared memory address by a first local processor which has caused a read miss for the address;

detecting the generated transaction by each local processor other than the first local processor;

determining, by each local processor which has detected the generated transaction, whether or not an entry having a same shared memory address as the address of the generated transaction is present in its respective cache memory by comparing addresses of all entries in the cache memory with the address of the generated transaction;

checking, by each local processor in which the entry of the same shared address is determined to be present, a stored state of data validity for the entry of the same shared address;

outputting data of the same shared memory address to the system bus by a second local processor which has the entry of the same shared address with the state determined to be valid;

deriving, by the first local processor, the output data of the same shared memory address from the system bus into its own cache memory and storing the data in an entry with a state of data validity of the entry valid; and deriving, by a third local processor which has the entry of the same shared address with the state determined to be invalid, the output data of the same shared memory address from the system bus into its respective cache memory to update the entry of the same shared memory address by the data and validating the state of data validity of the entry.

2. A method according to claim 1, further comprising the steps of:

notifying other processors of invalidity of the data of an entry when each processor updates the entry in its own cache memory by a writing operation; and making the state of such notified entry invalid in each cache memory having the entry.

3. A method according to claim 2, wherein each processor simultaneously updates the contents of the shared memory when updating an entry of their own cache memory by a writing operation.

4. A method according to claim 2, wherein the state of data validity includes information regarding whether or not the entry is shared with any other processors and said notifying step is executed when the state of the updated entry indicating the entry is shared.

5. A method according to claim 1, further comprising the step of setting, in each entry in each cache memory, a shared memory address with the state of data validity of each entry invalid in an initial state.

6. A method according to claim 5, wherein said resetting a shared memory address which had set based on a past history of cache memory utilization.

7. A processor constituting a multiprocessor system having a plurality of other processors interconnected via a system bus, said processor comprising:

cache memory means for storing a state of data validity for every entry together with the data;

generating means for generating a transaction requiring data of a shared memory address when a read miss has occurred for the address;

monitoring means for monitoring transactions on the system bus generated owing to read miss by other processors;

determining means for determining whether or not an entry having a same shared memory address as an address of a generated transaction detected by said monitoring means is present in said cache memory means by comparing addresses of all entries in said cache memory means with the address of the generated transaction, checking means for checking if the entry of the same shared address is determined to be present, a stored state of data validity for the entry;

output means for outputting data of the same shared memory address to the system bus when the entry of the same shared address with valid state determined to be present;

first deriving for deriving, a data portion output to the system bus from one of the other processor in response to the transaction, from the system bus into said cache memory means to store the data in an entry with a state of data validity of the entry valid if the transaction has generated by the own processor; and second deriving means for deriving, a data portion output to the system bus from one of the other processor in response to the transaction, from the system bus into said cache memory means to update the entry of the same shared memory address and validating the state of data validity of the updated entry if said determining means has determined that the entry of the same shared address with invalid state determined to be present.

* * * * *

UNITED STATES PATENT AND TRADEMARK OFFICE
CERTIFICATE OF CORRECTION

PATENT NO. : 5,737,568

DATED : April 7, 1998

INVENTOR(S) : KAZUMASA HAMAGUCHI ET AL.

It is certified that error appears in the above-identified patent and that said Letters Patent is hereby corrected as shown below:

AT [57] ABSTRACT

Line 1, "In a" should read --A--.

COLUMN 4

Line 63, "states" should read --state,--.

COLUMN 6

Line 67, "embodiments" should read --embodiment,--.

COLUMN 7

Line 60, "method" should read --method is provided--.

COLUMN 8

Line 65, "resetting" should read
        --resetting step is performed by resetting--.

UNITED STATES PATENT AND TRADEMARK OFFICE
CERTIFICATE OF CORRECTION

PATENT NO. : 5,737,568

DATED : April 7, 1998

INVENTOR(S) : KAZUMASA HAMAGUCHI ET AL.

It is certified that error appears in the above-identified patent and that said Letters Patent is hereby corrected as shown below:

<u>COLUMN 10</u>

Line 3, "determined" should read --is determined--.
    Line 5, "first deriving" should read
        --first deriving means-- and
        "deriving," should read --deriving--;
    Line 6, "processor" should read --processors--;
    Line 9, "has" should read --has been--;
    Line 10, "the own" should read --its own--;
    Line 11, "deriving," should read --deriving--;
    Line 12, "processor" should read --processors--; and
    Line 19, "determined" should read --is determined--.

Signed and Sealed this

First Day of December, 1998

*Attest:*

BRUCE LEHMAN

*Attesting Officer*      *Commissioner of Patents and Trademarks*